June 8, 1943.  J. A. ROBINSON  2,321,103
ELECTRICAL CIRCUIT
Filed March 13, 1940
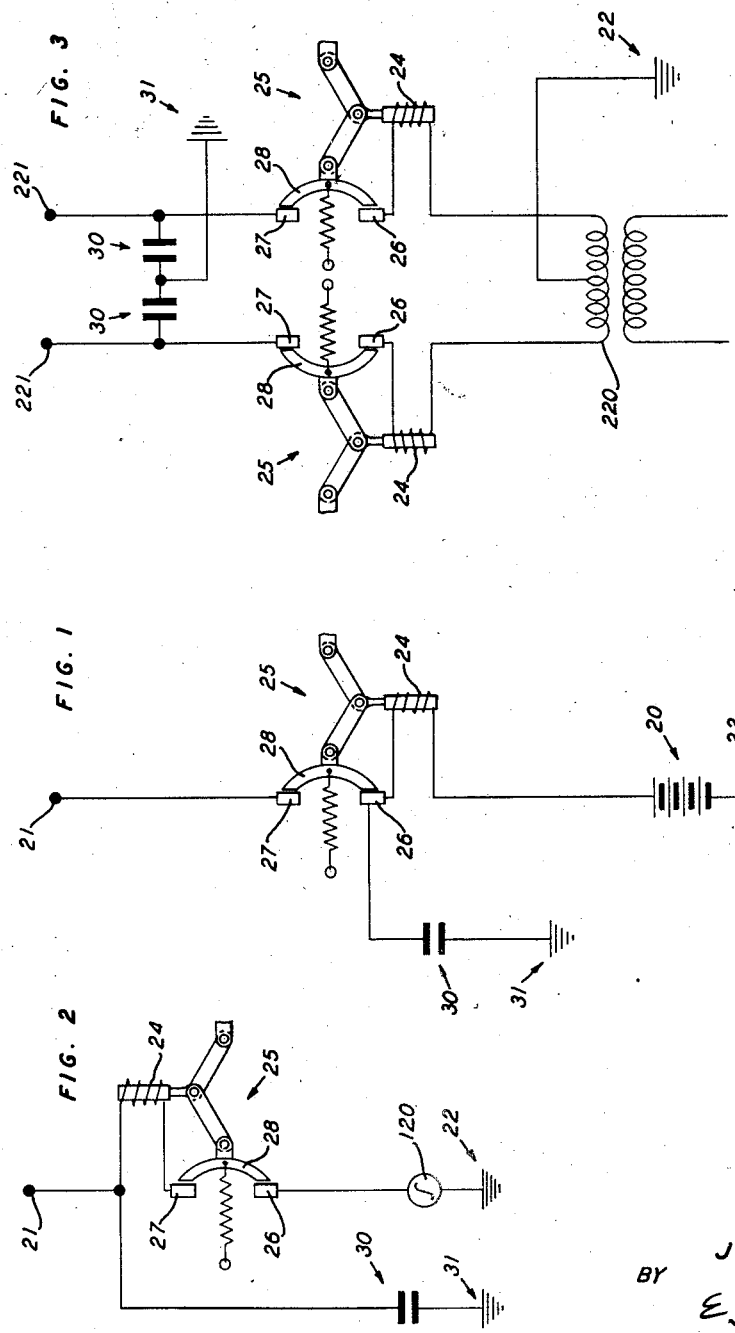
INVENTOR
J.A. ROBINSON
BY
E.R. Nowlan
ATTORNEY Patented June 8, 1943

2,321,103

UNITED STATES PATENT OFFICE 2,321,103

ELECTRICAL CIRCUIT

John A. Robinson, New York, N. Y., assignor to Western Electric Company, Incorporated, New York, N. Y., a corporation of New York Application March 13, 1940, Serial No. 323,681

2 Claims. (Cl. 178—44)

This invention relates to electrical circuits, and more particularly to a special type of electrical circuit in which a source of electrical power supplies current through an electromagnetic circuit breaker actuable by the same current and where the current so supplied is required to be free from parasitic voltage disturbances.

There is a great variety of electrical circuits in use today, particularly in telephone, radio and similar apparatus as well as in apparatus used for testing and operating control of such apparatus, in which electrical current is supplied for operating or control or test purposes from a convenient source through an electromagnetic circuit breaker. The source may supply either direct, pulsating or alternating current according to the arrangement and function of the particular apparatus, and may be electromagnetic or electrochemical in character, e. g. a generator or a battery, as convenience or necessity may prescribe in a given instance. In any case, the current, on its way from the source to the point of use, passes through the solenoid or winding of an overload circuit breaker as well as through the contacts of the circuit breaker, so that if for any reason there should be caused an increase of the current to an amount dangerous to the apparatus supplied or to its function, the circuit breaker will operate because of such overload to break the circuit. It may and often does happen that extraneous or parasitic effects in the current source cause the desired and useful constancy or regularity of the current to be affected by irregular minor fluctuations or by undesired superimposed regular alternations. Especially in the case of apparatus using amplifying means fed from the current derived from the source, such extraneous or parasitic disturbances may be the cause of much difficulty. Heretofore the difficulty has been obviated by including in the circuit one or another form of electrical filter assembly interposed between the circuit breaker and the load or point of useful application of the current.

An object of the present invention is to provide a power supply circuit for electrical apparatus including an overload circuit breaker, and including unusually simplified and yet effective means to prevent extraneous or parasitic effects in the supply current from reaching the load.

With the above and other objects in view, one embodiment of the invention may present a circuit for supplying electrical current from a source to a load, including an electromagnetic circuit breaker actuable by a solenoid connected in series in the circuit and combined with an electrical condenser connected into the circuit in series with the coil of the solenoid and in parallel with the load and electrically proportioned to form with the coil an effective filter to suppress disturbances in the circuit arising from the source.

Other objects and features of the invention will appear from the following detailed description of embodiments thereof, taken in connection with the accompanying drawing in which the same reference numerals are applied to identical parts in the several figures and in which Fig. 1 is a diagrammatic representation of an electrical circuit embodying the invention and adapted to supply constant direct current from a suitable source to a load;

Fig. 2 is a modified form of the arrangement of Fig. 1; and

Fig. 3 is a modified arrangement adapted to supply alternating current from a suitable source to a load.

In the arrangement shown in Fig. 1, it is desired to supply undisturbed constant direct current from a suitable source 20, here shown as an electrochemical battery, to a load, whose character is no part of the invention and hence is not disclosed, but which is thought of as having an input terminal 21. For simplicity the return circuit is thought of as being provided by grounding the unshown output terminal of the load and also the side of the battery away from the load as indicated at 22. While the source 20 is shown as a battery, which may be either primary or secondary, any suitable kind of direct current source, such as a generator, for example, may be employed as desired.

The load side of the source 20 is connected in series through the solenoid 24 of an overload circuit breaker generally indicated at 25, to one contact 26 of the circuit breaker. The other contact 27 of the circuit breaker is connected to the load input terminal 21. Thus the current from the source 20 passes through the solenoid 24, the contact 26, the connector bar 28 of the circuit breaker, and the contact 27 to the load, and returns via ground to the source.

An electrical condenser 30 is connected from one of the contacts of the circuit breaker to ground, being thus in parallel to the load in the main circuit and in series to the coil 24 in the path of disturbances by-passed through the condenser to ground By properly proportioning the electrical values of the condenser 30 and of the solenoid 24, especially the capacitance of the condenser in relation to the inductance of the solenoid, the two together will coact as an efficient low pass filter to prevent any disturbances in the current from being permitted to pass to the load.

In Fig. 1, the solenoid is shown between the source and the circuit breaker, and its companion condenser is shown as connected from the battery and contact of the circuit breaker to ground. A modification of this arrangement is shown in Fig. 2, where the solenoid is connected between the circuit breaker and the load, and the condenser is connected from the load end of the coil to ground. This modification may be preferred where it is desired to guard the load against disturbances arising from the circuit breaker itself, e. g. if it should spark or arc on opening. If for any reason it is more convenient, or, in a particular instance, more efficient to do so, the condenser in Fig. 1 might be connected from the contact 27, instead of from the contact 26, to ground. In any of these instances it is not necessary that the connector, between the condenser and the particular contact used, run actually to the contact itself but only to the power lead to or from the contact. Thus, in Fig. 3, the filter condensers are shown connected to the power leads from the circuit breaker to the load, and thus to the circuit breaker contacts on the power side.

Any of the above arrangements might well be satisfactory also for use where the source delivers alternating current to be fed to the load. Fig. 2 is modified from Fig. 1 in this respect also by substituting for the direct current source 20 of Fig. 1 a source 120 of alternating current. However, there may well be instances in which it is desired to similarly protect both sides of an alternating current power supply. An arrangement for this purpose is shown in Fig. 3. Here the secondary winding 220 of a transformer, whose primary is energized by any suitable means not shown, is the source of power. It is grounded at its center, as at 22, and its two ends are to supply current to two terminals 221 which may represent two distinct loads or two branches of a single load. Two identically similar circuit breakers 25 are connected, one in each lead from the secondary 220, with their actuating solenoids in series as before, each in its own line. A condenser 30 is connected to ground 31 from the load side of each circuit breaker, most conveniently by a common connection as shown.

Any of the arrangements shown, omitting the condenser or condensers 30 and ther connections, is very old. Since the development in the last thirty or forty years, of countless new applications of electricity, especially those employing alternating current of audio frequency, radio frequency and even higher frequencies, with or without superimposed direct current, it has often been found necessary or of advantage to insert a complete filter network of greater or less complexity into the supply circuit between the circuit breaker and the load. By employing the arrangement of the invention, no additional apparatus is required except the condensers 30, wheeras by the older method there must be a combination comprising at least a condenser and a coil inserted into the line between the circuit breaker and the load. But this entails loading the circuit with another coil to introduce additional problems of self induction, undesired resonances and the like in addition to those unavoidably present because of the solenoid of the circuit breaker. Thus the arrangement of the invention, which eliminates one unit from the pre-existing arrangements without eliminating its function, by utilizing the necesssarily present circuit breaker coil as also the coil of a filter, eliminates the troublesome previous difficulty of the two coils in series in the circuit, and reacting on each other as well as on the circuit.

The particular arrangements herein disclosed and described are illustrative and may be variously modified and departed from without departing from the spirit and scope of the invention as pointed out in and limited only by the appended claims.

What is claimed is:

1. In an electrical circuit including a load connected to a source of electrical power, means to protect the circuit against dangerously large surges arising from any cause and also against annoying minor disturbances caused by the source, the said means comprising a circuit breaker interposed between the source and load and having an actuating solenoid of which the coil is connected in the circuit in series with the contacts of the circuit breaker, and a condenser connected into the circuit in shunt across the load and in series with the coil of the circuit breaker solenoid, the condenser being electrically proportioned to form with the coil of the solenoid a filter effective to prevent minor disturbances from the source from reaching the load.

2. An electric circuit including a load connected to a source of electrical power, a circuit breaker to protect the circuit against dangerously large surges arising from any cause and having an actuating solenoid of which the coil is connected in the circuit in series with the contacts of the circuit breaker, and a condenser connected into the circuit in shunt across the load and in series with the coil of the circuit breaker solenoid, the condenser being electrically proportioned to form with the coil of the solenoid a filter effective to prevent minor disturbances from the source from reaching the load.

JOHN A. ROBINSON.